United States Patent
De Vos et al.

(10) Patent No.: US 10,855,170 B2
(45) Date of Patent: Dec. 1, 2020

(54) POWER MANAGEMENT INTEGRATED CIRCUIT WITH PROGRAMMABLE COLD START

(71) Applicant: E-PEAS S.A., Mont-Saint-Guibert (BE)

(72) Inventors: Julien De Vos, Mont-Saint-Guibert (BE); Geoffroy Gosset, Mont-Saint-Guibert (BE); Cedric Hocquet, Mont-Saint-Guibert (BE)

(73) Assignee: E-PEAS S.A., Mont-Saint-Guibert (BE)

( * ) Notice: Subject to any disclaimer, the term of this patent is extended or adjusted under 35 U.S.C. 154(b) by 0 days.

(21) Appl. No.: 16/625,027

(22) PCT Filed: Jun. 21, 2018

(86) PCT No.: PCT/EP2018/066657
§ 371 (c)(1),
(2) Date: Dec. 20, 2019

(87) PCT Pub. No.: WO2018/234499
PCT Pub. Date: Dec. 27, 2018

(65) Prior Publication Data
US 2020/0220451 A1 Jul. 9, 2020

(30) Foreign Application Priority Data
Jun. 22, 2017 (EP) ..................................... 17177506

(51) Int. Cl.
*H02J 7/00* (2006.01)
*G05F 1/67* (2006.01)
(Continued)

(52) U.S. Cl.
CPC ................ *H02M 1/36* (2013.01); *G05F 1/67* (2013.01); *H02J 7/0024* (2013.01);
(Continued)

(58) Field of Classification Search
CPC .......... H02M 1/36; H02M 3/158; H02M 3/07; H02M 2001/0006; G05F 1/67; H02J 50/001; H02J 7/0047; H02J 7/0024
See application file for complete search history.

(56) References Cited

U.S. PATENT DOCUMENTS

| | | | |
|---|---|---|---|
| 8,829,868 B2 * | 9/2014 | Waltman | H02M 3/156 323/271 |
| 10,536,072 B2 * | 1/2020 | Desai | H02M 3/33507 |

(Continued)

FOREIGN PATENT DOCUMENTS

JP   2008-199745 A   8/2008

OTHER PUBLICATIONS

Int'l. Search Report for PCT/EP2018/066657, dated Nov. 7, 2018.
(Continued)

*Primary Examiner* — Dinh T Le
(74) *Attorney, Agent, or Firm* — Blue Filament Law PLLC

(57) ABSTRACT

A power management integrated circuit (PMIC) is provided for extracting power from an energy harvester. The PMIC includes a voltage converter to convert an input power at a voltage $V_{in}$ into an output power at an output voltage $V_{out\_VC}$. The voltage converter includes, in addition to a main voltage converter circuit, a cold-start circuit for starting the voltage converter from an OFF state. The PMIC further includes an input terminal for receiving a voltage $V_{EN\text{-}CS}$ proportional to the converter input voltage $V_{in}$ and a voltage comparator for comparing the voltage $V_{EN\text{-}CS}$ with a reference voltage $V_{ref}$. A controller enables the cold-start circuit when $V_{EN\text{-}CS} \geq V_{ref}$.

17 Claims, 6 Drawing Sheets

Figure 1A:
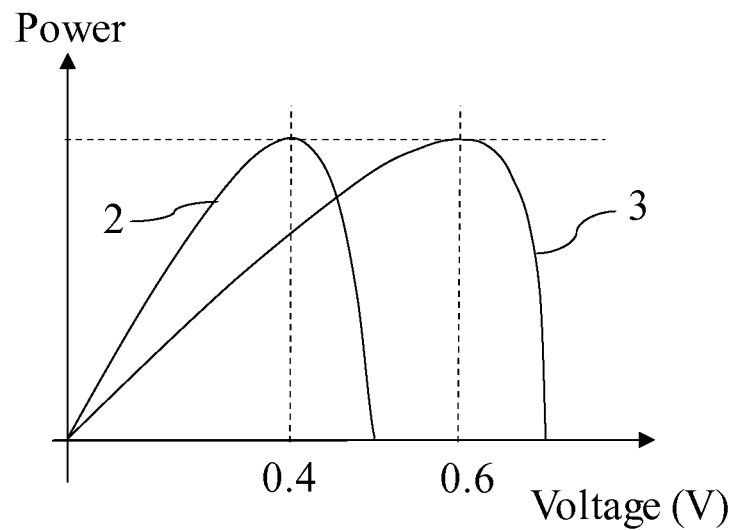

(51) Int. Cl.
*H02M 1/36* (2007.01)
*H02M 3/158* (2006.01)
*H02M 3/07* (2006.01)
*H02M 1/00* (2006.01)
*H02J 50/00* (2016.01)

(52) U.S. Cl.
CPC ........... *H02J 7/0047* (2013.01); *H02M 3/158* (2013.01); *H02J 50/001* (2020.01); *H02M 3/07* (2013.01); *H02M 2001/0006* (2013.01)

(56) References Cited

U.S. PATENT DOCUMENTS

| | | |
|---|---|---|
| 2006/0152200 A1 | 7/2006 | Kanai et al. |
| 2012/0313612 A1 | 12/2012 | Schneider |
| 2019/0020290 A1* | 1/2019 | Feng .................. H02J 7/34 |

OTHER PUBLICATIONS

Semiconductors E.Peas: "AEM10940 Highly Efficient, Dual Regulated Output, Ambient Energy Manager," Nov. 17, 2016; https://e-peas.com/wp-content/uploads/2016/02/DS_AEM10940_REV1.3.pdf, 14 pp.

* cited by examiner

US 10,855,170 B2

POWER MANAGEMENT INTEGRATED CIRCUIT WITH PROGRAMMABLE COLD START

FIELD OF THE INVENTION

The present invention relates to a power management integrated circuit (PMIC) for managing energy from an energy harvester. The present invention also relates to an energy harvesting system comprising a PMIC, an energy harvester and an energy storage device and/or an application load.

The invention further relates to a method for energy harvesting from an energy harvester using a voltage converter comprising a main voltage converter circuit and a cold-start converter circuit.

DESCRIPTION OF PRIOR ART

A PMIC for energy harvesting is a microchip that is designed to acquire and manage the microwatts to milliwatts of power generated by an energy harvester. These PMIC's for energy harvesting are known in the art and typically comprise a first input terminal for making a connection with the energy harvester so as to receive an input power. The PMIC comprises a voltage converter that receives the input power from the energy harvester and converts the input power in an output power that is transferred to one or more output terminals. An example of such a PMIC is known under reference AEM10940 and provided by the company e-peas S.A., Belgium.

A first output terminal can for example be connected with an energy storage device for storing the energy harvested from the energy harvester. Some PMIC's also comprise a load regulating circuit for regulating a transfer of power from the energy storage device to an application load that is connected to a second output terminal. The application load is for example an application circuit such as a microcontroller or a radio transceiver. The load regulating circuit can regulate the output voltage at the second output to a specific voltage value in accordance with the requirements of the application load used.

A power management integrated circuit is for example available from the applicant of the current patent application and known under the reference number AEM10940. The PMIC has to be construed as an interface between the energy harvester and an energy storage device and, generally, also an interface to one or more application loads or application circuits. During operation, energy is extracted from the energy harvester source and transferred to the energy storage device via the PMIC. The energy stored in the energy storage device can then be supplied to the one or more application circuits or alternatively, energy of the energy harvester is transferred directly to the application load via the voltage converter.

Examples of energy harvesters are photovoltaic cells (PV), thermoelectric generators (TEG) and electromagnetic energy sources. Examples of storage devices are Li-ion battery, a thin film battery or a super or a conventional capacitor.

A voltage converter for converting an input voltage $V_{in}$ into an output voltage $V_{out\_VC}$ at an output of the voltage converter, generally comprises a high-efficient main voltage converter circuit comprising for example a DC-DC boost converter for increasing the input voltage $V_{in}$, or a buck converter for decreasing the input voltage, or a buck-boost converter for both decreasing or increasing the input voltage.

As known in the art, the main voltage converter circuit generally comprises a power point tracker circuit for repetitively determining a nominal start-up voltage $V_N$. The main voltage converter circuit is then started when the input voltage of the PMIC corresponds to this nominal start-up voltage $V_N$. This nominal start-up voltage $V_N$ is determined for optimally extracting power from the energy harvester with the main voltage converter circuit. In this way, the main voltage converter circuit obtains a high efficiency for extracting power. For example, with the PMIC with reference AEM10940 mentioned above, extraction efficiencies in the range between 65% and 95% have been obtained. The power point tracker is also named maximum power point tracker (MPPT). When solar cells are used as an energy harvester, the power point tracker circuit typically determines the nominal start-up voltage $V_N$ as a 90% fraction of the open-circuit voltage of the energy harvester.

A further example for determining the maximum power point for starting operating the main voltage converter is disclosed in US2012/0313612, wherein during nominal operation of the main voltage converter a feedforward circuit is used to dynamically adjust an operational point for starting the main voltage converter.

In addition, the main voltage converter circuit requires a minimum operational voltage to drive the main voltage converter circuit. Typically, for operating a main voltage converter circuit an operational voltage of for example 1.5 V or more is needed. The operational voltage to drive the main voltage converter circuit is available when the PMIC is in a normal operation mode wherein a minimum output voltage $V_{out\_MIN}$ is available to drive the main voltage converter circuit. When for example the energy storage device has no energy or a too low energy level, the output voltage $V_{out\_VC}$ is zero or too low to operate the main voltage converter circuit. Another example is when the energy harvester has not been deployed yet. In this case, before using the energy harvester for the first time, the storage device is disconnected from the PMIC to avoid that when for example a rechargeable battery is used as a storage device, this battery discharges it's energy into the PMIC before the system is fully deployed. Hence, also in this situation, when starting energy harvesting for the first time, the minimum voltage $V_{out\_MIN}$ at the output of the voltage converter will not be available to start energy harvesting with the main voltage converter circuit.

Therefore, the voltage converter generally comprises, in addition to the main voltage converter circuit, a cold-start voltage converter circuit that allows to start acquiring energy from the energy harvester in a PMIC degraded mode without the use of the main voltage converter circuit. The cold-start voltage converter circuit has however a low efficiency. The PMIC remains in the degraded mode until the PMIC operational voltage is above the minimum operational voltage needed to start operating the main voltage converter circuit. These cold-start voltage converter circuits are configured to start operating with a low voltage input and a low power. The PMIC with reference AEM10940 comprises for example a cold-start voltage converter circuit that starts to operate at an input voltage $V_{in}$ as low as 380 mV and with an input power of 11 microwatt. The input voltage at which the cold-start circuit starts operating is also named cold-start start-up voltage.

Figure 1B:
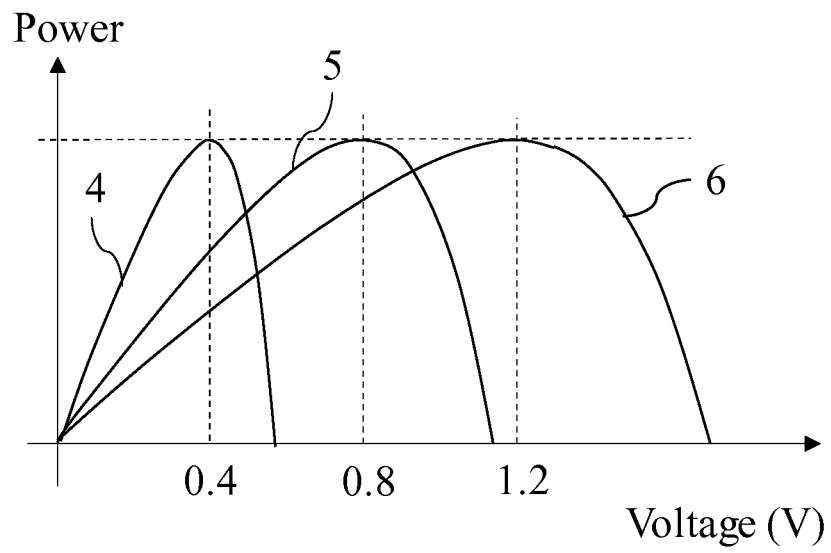

However, one of the problems with the cold-start voltage converter circuits of the prior art PMIC's used for energy harvesting is that the extraction of power from the energy harvester in the PMIC degraded mode is not efficient because the cold-start voltage converter is not operating at the optimum voltage for extracting energy from the energy harvester. An optimum voltage for extracting energy is for example a voltage where a maximum of power can be extracted from the energy harvester. The optimum voltage to start a cold-circuit depends however on the type of energy harvester and on the specific characteristics of the energy harvester. For example, for a photovoltaic cell (PV) the optimum voltage to extract power depends on the cell technology (e.g. Silicon or Gallium Arsenide) and on the cell topology. This is illustrated in FIG. 1a where the typical power-voltage (P-V) curve is shown for two PV cells having a different technology: for the first cell technology (curve 2) the maximum power is extracted at an optimum voltage of 0.4 V and for the second cell technology (curve 3) at 0.6 V. In FIG. 1b, the P-V curve for three photovoltaic panels having the same size, i.e. delivering the same power, but having three different topologies is shown. The three topologies presented are a single cell topology (curve 4), a two cells in series topology (curve 5) and a three cells in series topology (curve 6). In this example, the optimum voltage to extract maximum power is at three different voltage values.

Figure 2A:
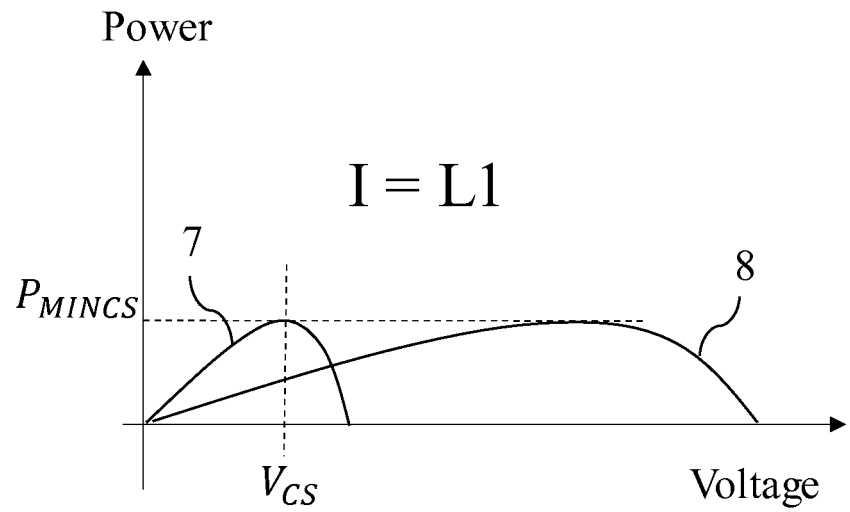
Figure 2B:
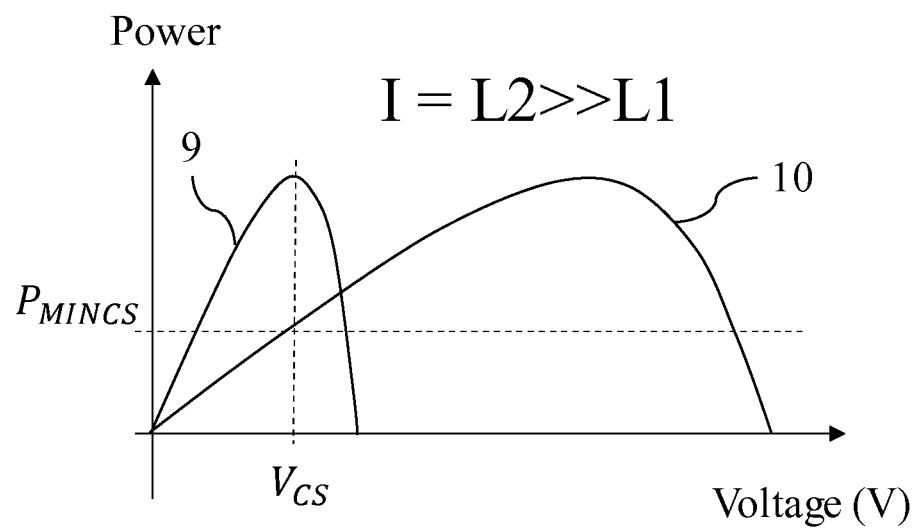

A further problem is related to the fact that the cold-start voltage converter circuit needs a minimum power $P_{MINCS}$ to start operating. When the cold-start voltage converter is designed to operate at a given voltage $V_{CS}$, the minimum power is not necessarily always available from the energy harvester. This is illustrated in FIG. 2a where the P-V curve for two different solar panels receiving a given small light illumination L1 is shown: one panel with a one cell topology (curve 7) and one panel with a three cell (curve 8) topology. The minimum power $P_{MINCS}$ needed to start the cold-start voltage converter is indicated on the figure. For the one cell topology when at the cold-start voltage of $V_{CS}$, the minimum power $P_{MINCS}$ needed to start the cold-start circuit is available. However, when using the three cell topology, when at $V_{CS}$, there is not enough power available to start the cold-start voltage converter circuit and hence the PMIC will not harvest any energy at this illumination L1. FIG. 2b shows the P-V curve of the same two panels having a different topology, under a higher illumination L2. Curve 9 corresponds to a one cell panel and curve 10 corresponds to a three cell panel. As shown on FIG. 2b, the three cell panel (curve 10) can start harvest energy only at this higher illumination. Hence, for a given topology of the energy harvester, the starting of the cold start circuit will depend on the available illumination.

SUMMARY OF THE INVENTION

It is an object of the present invention to provide a PMIC that provides a solution for the problems mentioned above with respect to performing a more efficient operation of the cold-start voltage converter circuit for various types of energy harvesters, comprising various technologies and topologies.

The present invention is defined in the appended independent claims. Preferred embodiments are defined in the dependent claims.

According to a first aspect of the invention, a power management integrated circuit (PMIC) for managing energy from an energy harvester is provided. Such a PMIC comprises a first input terminal for receiving electrical power from the energy harvester, a first output terminal for connecting an energy storage device, and a voltage converter for converting an input power into an output power. The voltage converter is operable for providing the output power at an output voltage $V_{out\_VC}$. The voltage converter comprises a main voltage converter circuit operable when the output voltage $V_{out\_VC}$ is equal or larger than a minimum voltage value $V_{out\_MIN}$, and a cold-start circuit operable when the output voltage $V_{out\_VC}$ is lower than the minimum voltage value $V_{out\_MIN}$. The PMIC comprises a conducting path for transferring the electrical power from the first input terminal to the voltage converter and a first connecting circuit for transferring the output power of the voltage converter to the first output terminal.

The PMIC according to the invention is characterized in that the PMIC further comprises a second input terminal for receiving a voltage $V_{EN\text{-}CS}$, a voltage comparator configured for monitoring this voltage $V_{EN\text{-}CS}$ at the second input terminal and for comparing the voltage $V_{EN\text{-}CS}$ with a reference voltage $V_{ref}$. The PMIC further comprises a controller for controlling the voltage converter. The controller is configured for enabling the cold-start circuit when the voltage $V_{EN\text{-}CS}$ is equal or larger than the reference voltage $V_{ref}$ and the output voltage $V_{out\_VC}$ is lower than the minimum output voltage value $V_{out\_MIN}$. Enabling the cold-start circuit has to be construed as enabling operation of the cold-start circuit.

Advantageously, by providing a second input terminal for providing a voltage $V_{EN\text{-}CS}$ and comparing this voltage with a reference voltage, the moment the cold-start is enabled to start harvesting energy of the harvester will depend on the voltage $V_{EN\text{-}CS}$ applied at the second input terminal. Indeed, as the voltage comparator is monitoring this voltage $V_{EN\text{-}CS}$, the cold-start is only enabled when this voltage $V_{EN\text{-}CS}$ is equal or larger than the reference voltage $V_{ref}$. By configuring this voltage $V_{EN\text{-}CS}$ applied to the second input terminal as a fraction of the voltage $V_{in}$ present at the first input terminal, i.e. $V_{EN\text{-}CS}=V_{in}/N$, with N being the reduction factor, the moment the cold-start will start operating will depend on the input voltage $V_{in}$, on the reduction factor N selected and on the reference voltage $V_{ref}$ of the comparator. Hence by taking into account the value of the reference voltage $V_{ref}$ provided by the comparator and by selecting the reduction factor N, the user can program at what optimum input voltage $V_{in}$ the PMIC should start enabling the cold-start circuit.

Advantageously, depending on the type of energy harvester to be used, the reduction factor can be adequately defined such that the cold-start circuit is triggered only when the input voltage at the voltage converter has a value that is optimum for, for example, maximum power extraction from the energy harvester.

Advantageously, the same PMIC can be used for various types of harvesters or for various topologies. Only the external voltage reducer has to be adjusted by selecting the right reduction factor N for a given energy harvester type in order to start the power extraction at an optimum input voltage.

In preferred embodiments, the voltage converter is further configured for disabling the cold-start circuit and enabling the main-voltage converter circuit when the output voltage $V_{out\_VC}$ is equal or larger than the minimum output voltage value $V_{out\_MIN}$.

In embodiments, the main voltage converter circuit comprises an inductive boost converter circuit for increasing the input voltage, or a buck converter circuit for decreasing the input voltage, or a buck-boost converter circuit for both decreasing or increasing the input voltage.

In preferred embodiments, the cold-start circuit comprises a charge pump and one or more oscillators and the controller is enabling or disabling the cold-start circuit by enabling or disabling the one or more oscillators.

The present invention is also related to an energy harvesting system comprising a power management integrated circuit PMIC according to the invention, an energy harvester connected to the first input terminal, an energy storage device connected to the first output terminal and a voltage reducer configured for generating the voltage $V_{EN\text{-}CS}$ at the second input terminal. The voltage reducer is configured for generating a voltage $V_{EN\text{-}CS}$ that is proportional with an input voltage $V_{in}$ at the first input terminal and wherein the voltage $V_{EN\text{-}CS}$ can be expressed as $V_{EN\text{-}CS}=V_{in}/N$ with N>1 and N being a voltage reduction factor.

In preferred embodiments, the voltage reducer comprises a first impedance with impedance value Z1 conductively connected with a first end to the first input terminal and conductively connected with a second end to the second input terminal, and a second impedance with impedance value Z2 conductively connected with a first end to the second input terminal and conductively connected with a second end to a common ground level. In this way, the voltage $V_{EN\text{-}CS}$ at the second input terminal can be expressed as $V_{EN\text{-}CS}=V_{in}\times Z2/(Z1+Z2)$.

According to a second aspect of the invention, a method for energy harvesting from an energy harvester is provided as disclosed in the appended claims.

SHORT DESCRIPTION OF THE DRAWINGS

Figure 3:
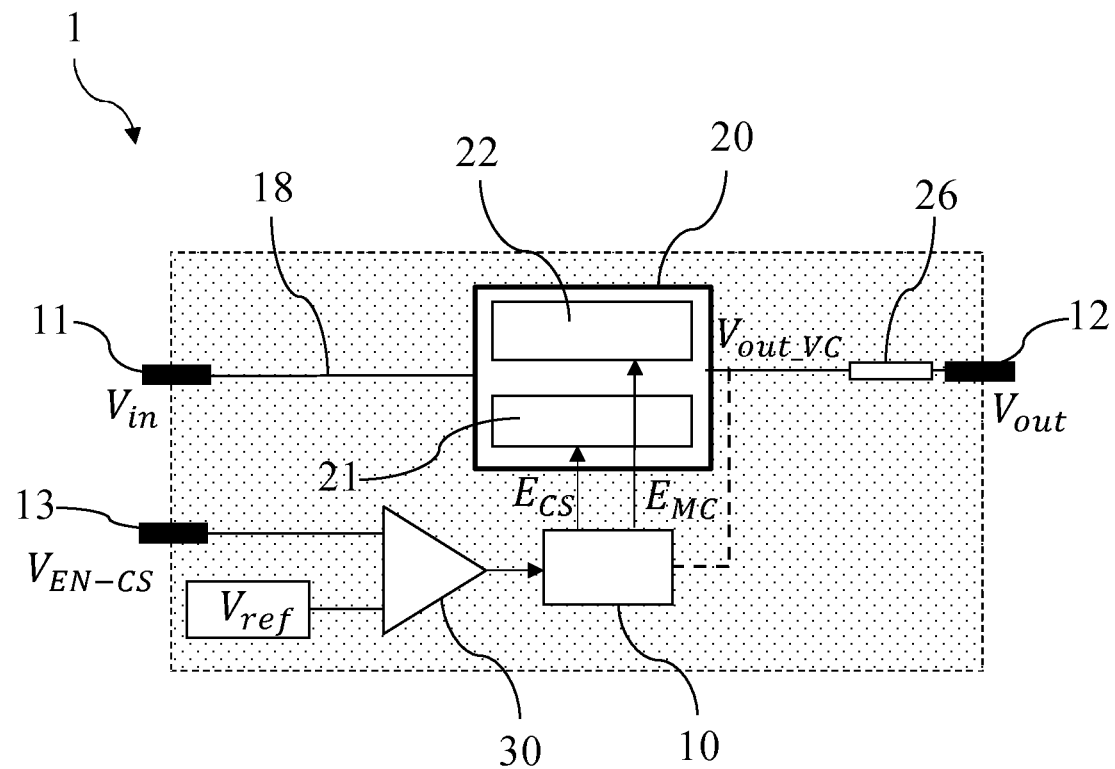
Figure 4:
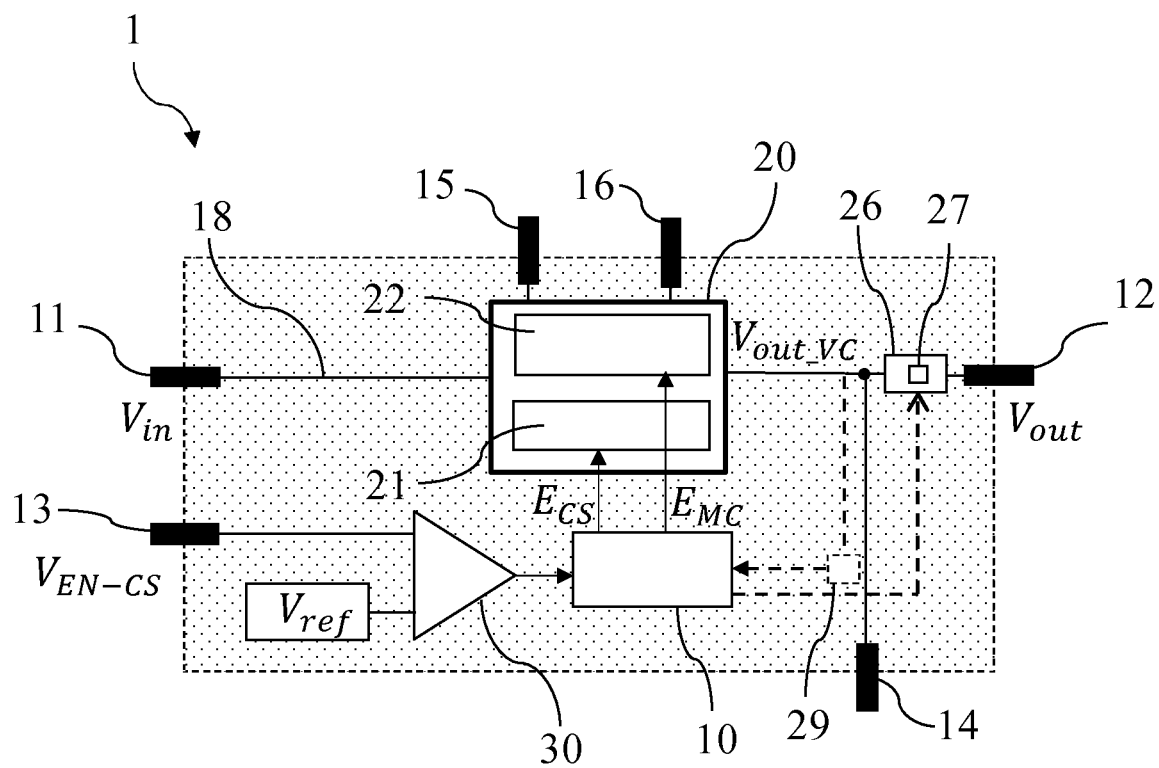
Figure 5:
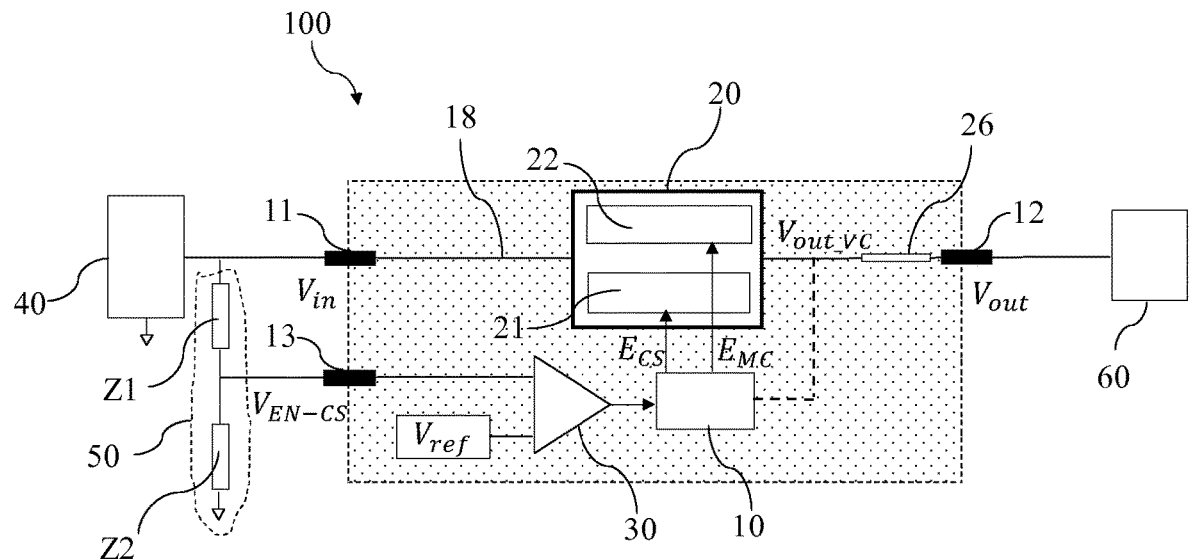
Figure 6:
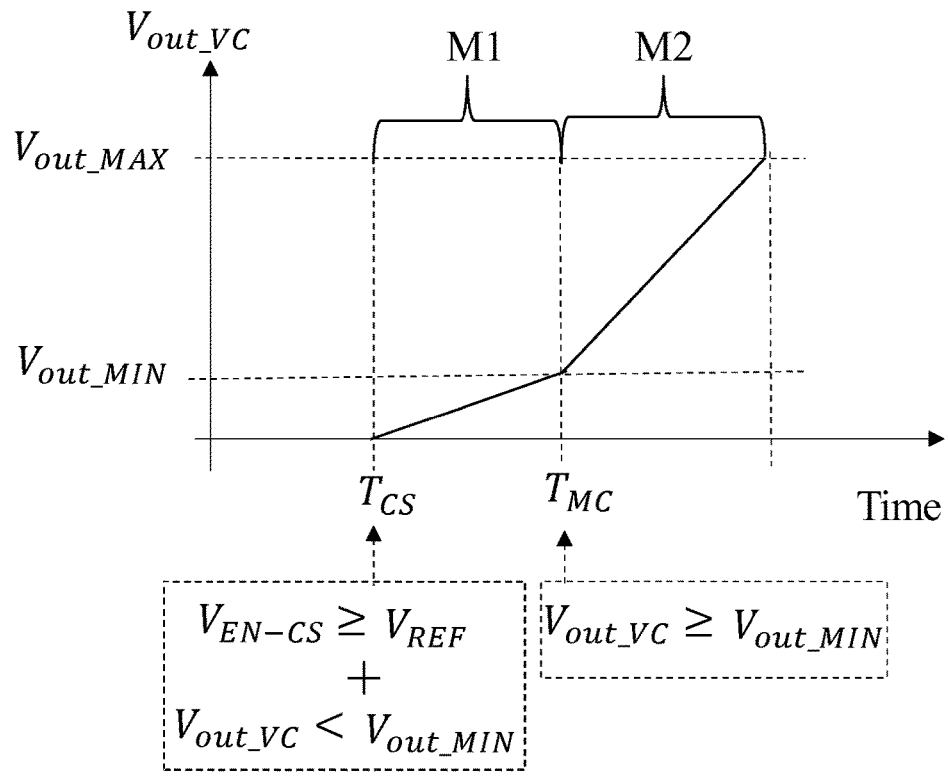
Figure 7:
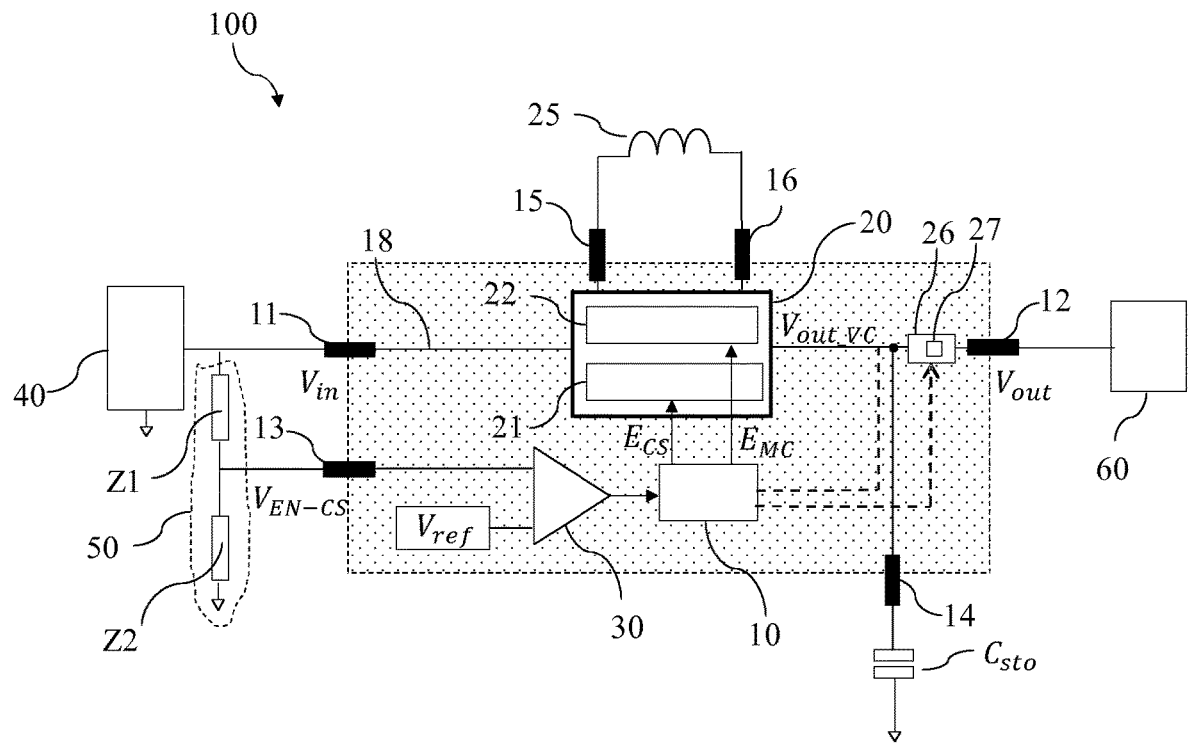
Figure 8:
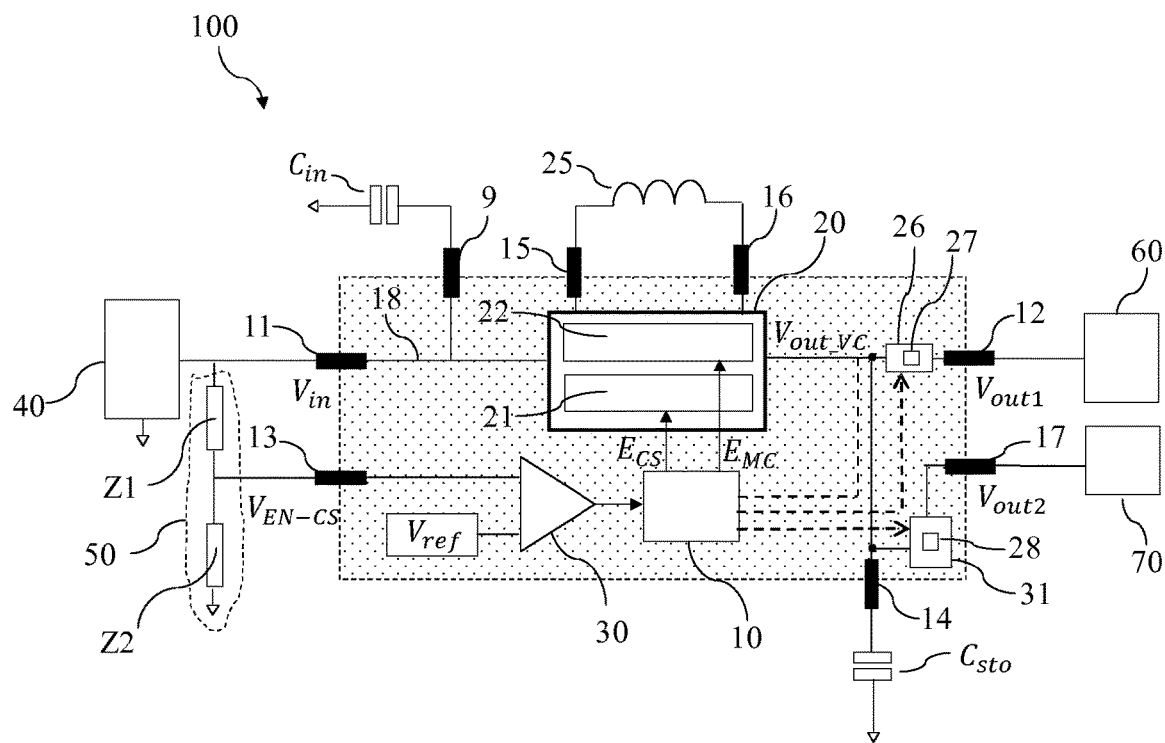
Figure 9:
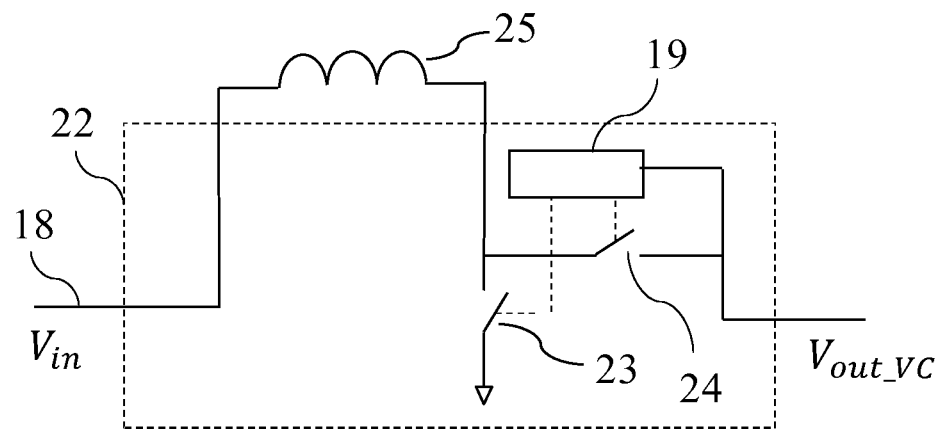
Figure 10:
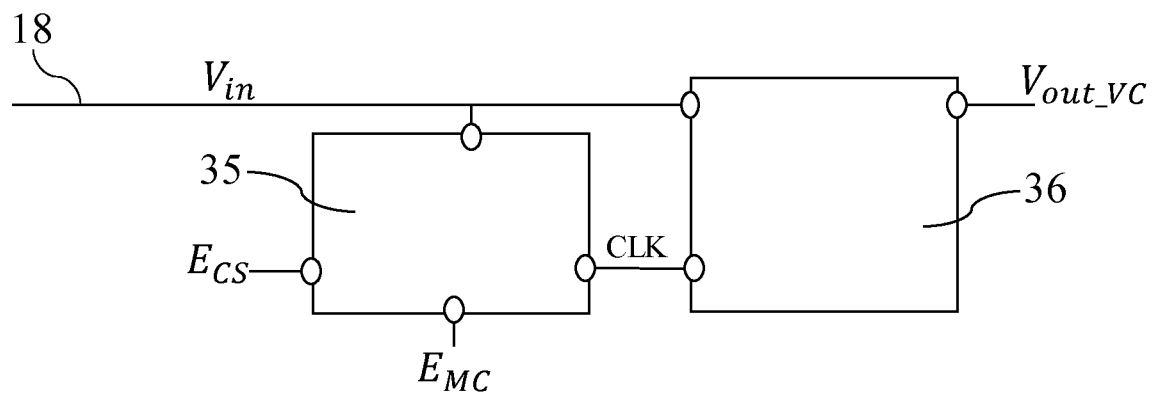

These and further aspects of the invention will be explained in greater detail by way of example and with reference to the accompanying drawings in which:

FIG. 1a shows a power-voltage curve for exemplary PV cells having two different technologies, FIG. 1b shows examples of power-voltage curves for three different cell topologies, FIG. 2a illustrates a power-voltage curve for two different cell topologies obtained when a low illumination is present, FIG. 2b illustrates a power-voltage curve for two different cell topologies obtained when a high illumination is present, FIG. 3 shows an example of a PMIC according to the invention, FIG. 4 shows a further example of a PMIC according to the invention, FIG. 5 shows an example of an energy harvesting system according to the invention FIG. 6 illustrates an evolution of the output voltage of the voltage converter, FIG. 7 shows a further example of an energy harvesting system, FIG. 8 shows an energy harvesting system comprising an a storage device and an application load, FIG. 9 shows an exemplary circuit of a main voltage converter, and FIG. 10 shows an example of a cold start circuit.

DETAILED DESCRIPTION OF PREFERRED EMBODIMENTS

According to a first aspect of the invention a power management integrated circuit (PMIC) for energy harvesting is provided. Examples of energy harvesting PMIC's according to the invention are schematically illustrated in FIG. 3 and FIG. 4.

The PMIC according to the invention has to be construed as a microchip comprising integrated circuits and a number of input/output pins, also named terminals. Some PMIC's can have for example, 16 or 32 terminals. Generally, the PMIC's have a compact packaging resulting in a square or rectangular footprint with sides having a length between 3 and 5 mm. On FIG. 3 and FIG. 4, the rectangular with a dotted pattern schematically illustrates the footprint of the PMIC packaging and the terminals are schematically indicated with small black rectangles.

A power management integrated circuit PMIC for managing energy from an energy harvester, comprises a first input terminal 11 for connecting the energy harvester so as to receive an input power from the energy harvester and a first output terminal 12 for connecting the energy storage device or for connecting the application load.

As will be further discussed, the PMIC according to the invention is not limited to one output terminal. As will be shown, in embodiments according to the invention, multiple output terminals can be present. For example, a first output terminal can be used to connect the storage device and one or more additional output terminals can be used to connect one or more application loads.

The PMIC comprises a voltage converter 20 for converting an input power into an output power. The voltage converter is operable for providing the output power at an output voltage $V_{out\_VC}$.

The voltage converter 20 comprises a main voltage converter circuit 22 and a cold-start circuit 21. The main voltage converter circuit 22 is operable when the PMIC is in a normal operation mode wherein the output voltage $V_{out\_VC}$ is equal or larger than a minimum voltage value $V_{out\_MIN}$. Typically the main voltage converter 22 comprises a number of switches that need a minimum operational voltage to operate and therefore the main voltage converter 22 is only operable if this minimum voltage $V_{out\_MIN}$ has been reached. To reach this minimum voltage $V_{out\_MIN}$, a cold-start circuit is used. The cold-start voltage converter 21 is operable when the PMIC is in a degraded mode. The degraded mode is a mode wherein the output voltage $V_{out\_VC}$ is smaller than the minimum voltage value $V_{out\_MIN}$. Hence in this degraded mode, the main voltage converter is not operable as the minimum operational voltage to drive the main voltage converter 22 is not available. As known in the art, the cold-start circuit has a low power transfer efficiency when compared to the main voltage converter circuit, which generally has a high power transfer efficiency.

As illustrated in FIG. 3, the PMIC according to the invention comprises a conducting path 18 for transferring the input power from the first input terminal 11 to the voltage converter 20 and a first connecting circuit 26 for transferring the controlled output power from the voltage converter 20 to the first output terminal 12.

The output voltage $V_{out}$ at the first output terminal 12 can be equal or different from the output voltage $V_{out\_VC}$ at the output of the voltage converter 20. For example if the first connecting circuit 26 is a conductor or a conducting path, the voltage at the output terminal will be equal to $V_{out\_VC}$. In other embodiments, as will be discussed below, the first connecting circuit 26 can for example comprise a storage controller for controlling a storage device. For these embodiments, the output voltage can be different from the output voltage of the voltage converter.

The PMIC according to the invention is characterized in that the PMIC further comprises a second input terminal 13 for receiving a voltage $V_{EN\text{-}CS}$ and a voltage comparator 30. The voltage comparator is configured for monitoring the voltage $V_{EN\text{-}CS}$ at the second input terminal 13 and for comparing the voltage $V_{EN\text{-}CS}$ with a reference voltage $V_{ref}$. The name of the voltage $V_{EN\text{-}CS}$ monitored at the second input terminal is not important for the invention and can be given any name, it can be named enabling voltage for the cold start as the enabling of the cold start is based on this voltage or it could be named feedback voltage in the sense that as will be discussed below, in embodiments of an energy harvesting system this voltage $V_{EN\text{-}CS}$ is proportional with the input voltage at the energy harvester, and hence in the broadest sense of the word feedback, gives feedback information with respect to the input voltage at the energy harvester.

The PMIC according to the invention further comprises a controller 10 for controlling the voltage converter 20. The controller is configured for enabling the cold-start circuit 21 when $V_{EN\text{-}CS} \geq V_{ref}$ and $V_{out\_VC} \leq V_{out\_MIN}$. As discussed above, enabling the cold-start circuit has to be construed as enabling operation of the cold-start circuit. In preferred embodiments, the controller 10 is further configured for disabling the cold-start circuit and enabling, i.e. enabling operation, the main voltage converter circuit 22 when $V_{out\_VC} > V_{out\_MIN}$. This is schematically illustrated on FIG. 3 and FIG. 4 where an arrow $E_{CS}$ and an arrow $E_{MC}$ indicate the enabling signal for the cold-start converter circuit 21 and the enabling signal for the main voltage converter circuit 22 by the controller 10, respectively, when the above defined conditions are fulfilled. The controller 10 is configured for generating these signals $E_{CS}$ and $E_{MC}$, which are generally digital signals.

The PMIC uses an output voltage sensing circuit 29 configured for comparing the output voltage $V_{out\_VC}$ with the minimum voltage $V_{out\_MIN}$. Depending on the detailed architecture of the PMIC, the output voltage sensing circuit 29 is either part of the controller 10, or, in other embodiments as schematically illustrated in FIG. 4, it can also be an additional element to the controller 10. In FIG. 3, a dotted line connecting the output of the converter with the controller 10, schematically illustrates the controller receiving the output voltage $V_{out\_VC}$.

In FIG. 6, an example is shown illustrating the evolution of the output voltage $V_{out\_VC}$ as function of time for a PMIC that starts from a complete OFF state, i.e. a state where the output voltage $V_{out\_VC}$ is zero Volt. This is for example the case when a fully depleted energy storage device is connected to the first output terminal and hence no energy is available to drive the switches of the main voltage converter. As schematically illustrated in FIG. 6, the voltage converter operates first in the degraded operation mode M1 until the minimum output voltage of $V_{out\_MIN}$ is reached before switching to the normal operation M2. The degraded mode starts in this example at time $T_{CS}$ when the condition $V_{EN\text{-}CS} \leq V_{ref}$ and the condition $V_{out\_VC} < V_{out\_MIN}$ are fulfilled. The normal operation mode starts at time $T_{MC}$ when the condition $V_{out\_VC} \geq V_{out\_MIN}$ is fulfilled. In this example shown on FIG. 6, the voltage $V_{out\_MAX}$ corresponds to the maximum voltage the voltage at the output of the voltage converter can reach.

As discussed above, the main voltage converter circuit 22 comprises for example a boost converter circuit, a buck converter circuit or a buck-boost converter circuit, known in the art. An exemplary voltage converter 20 comprising a boost converter circuit is schematically illustrated on FIG. 9. Such a boost converter circuit uses an inductor 25 and a first 23 and a second 24 voltage converter switch that are controlled by a voltage converter controller 19. In some embodiments this voltage converter controller 19 can be part of the controller 10. As shown on FIG. 9, when a boost converter is used, the inductor 25 is placed in series with the conducting path 18. The conducting path 18, as shown on FIG. 3, is connected with the first input terminal 11 for receiving the electrical power from the energy harvester. As well known in the art, by cyclically controlling the first and second switch, magnetic energy stored in the inductor is cyclically transferred to a load connected to the voltage converter output that is at a higher voltage $V_{out\_VC}$ than the voltage $V_{in}$ at the converter input. This load connected to the voltage converter output is for example a capacitor. In some embodiments, as illustrated in FIG. 7 and FIG. 8, the inductor 25 is located outside the PMIC and terminals 15,16 are provided to the PMIC to connect the inductor 25. The voltage converter controller 19, shown on FIG. 9, uses the output voltage $V_{out\_VC}$ to control the first 23 and second 24 switch of the main voltage converter. This second switch 24 can be a diode. As discussed above, a minimum voltage $V_{out\_MIN}$ is needed for driving the first and second switch. An example of a cold-start circuit known in the art is shown on FIG. 10. This cold-start circuit comprises an oscillator 35 and a charge pump 36. The oscillator is enabled by the enabling signal $E_{CS}$ from controller 10 and the output of the oscillator is the clock signal CLK of a charge pump circuit. The output of the charge pump supplies the node $V_{out\_VC}$.

As discussed above, the comparator 30 compares the reference voltage $V_{ref}$ with the voltage $V_{EN\text{-}CS}$ and the cold-start circuit 21 is turned on by the control signal $E_{CS}$ generated by the controller 10 when $V_{EN\text{-}CS} \geq V_{ref}$. This control signal $E_{CS}$ is for example a binary digital signal with value 0 or 1. The PMIC uses, as illustrated in FIG. 4, a output voltage sensing circuit 29 configured for comparing the output voltage $V_{out\_VC}$ with the minimum voltage $V_{out\_MIN}$ needed for operating the main voltage converter 22. Such a sensing and comparison circuit for defining the switching from the cold-start circuit to the main voltage converter circuit is well known in the art, for example known from the PMIC with reference number AEM10940 mentioned above. The controller 10 is configured for generating the control signal $E_{MC}$ when $V_{out\_VC} \leq V_{out\_MIN}$. This signal is for example also a binary signal 0/1. This signal allows for disabling the cold-start and enabling the start of the main voltage converter 22. The signal $E_{MC}$ turns off the one or more oscillators of the cold-start circuit 21.

The use of voltage comparators in electronic circuits is also well known in the art and for example a comparator based on an operational amplifier can be used. For providing a reference voltage, such as $V_{ref}$, the PMIC uses a reference voltage generator. Various reference voltage generating devices working at low voltage exist in the art. For example, in U.S. Pat. No. 6,870,229, an ultra-low power reference voltage generator is disclosed using n-MOS and p-MOS transistor technology. The comparator reference voltage $V_{ref}$ is a fixed value associated to the PMIC and has a typical value between 0.2 V and 0.6 V.

The comparator 30, the output voltage sensing circuit 29 and the controller 10 are schematically presented on FIG. 3 as separated elements. However in other embodiments the controller 10 can be construed as an overall controller comprising the comparator 30 and the output voltage sensing circuit 29.

In FIG. 5, an example of an energy harvesting system 100 is schematically shown. The energy harvesting system comprises a power management integrated circuit PMIC according to the invention, an energy harvester 40 connected to the first input terminal 11, an energy storage device 60 connected to the first output terminal 12 and a voltage reducer 50 configured for generating the voltage $V_{EN\text{-}CS}$ at the second input terminal 13. The voltage reducer generates a voltage $V_{EN\text{-}CS}$ that is proportional with the input voltage $V_{in}$ at the first input terminal 11. The voltage $V_{EN\text{-}CS}$ can be expressed as $V_{EN-CS}=V_{in}/N$ with N being a voltage reduction factor that is larger than one.

In embodiments, the voltage reducer 50 has to be construed as a voltage divider. For these embodiments, the voltage reducer comprises a first impedance with impedance value Z1 and a second impedance with impedance value Z2. As schematically shown on FIG. 5, the first impedance is conductively connected with a first end to the first input terminal 11 and conductively connected with a second end to the second input terminal 13. The second impedance is conductively connected with a first end to the second input terminal 13 and conductively connected with a second end to a common ground level such that $V_{EN-CS}=V_{in}\times Z2/(Z1+Z2)$.

An advantage of the PMIC according to the invention is that various energy harvester technologies and/or various topologies can be used for providing the input power to the PMIC. Depending on the type of energy harvester, the reduction factor N is chosen such that the cold-start converter circuit will start operation when an optimum input voltage at the first input terminal is reached. This optimum input voltage is for example the voltage where the maximum power can be extracted from the energy harvester and this optimum voltage is, as discussed above and illustrated with FIGS. 1a, 1b, 2a and 2b, different for each energy harvester type (e.g. PV cells, TEG's, electromagnetic energy sources) or for each topology used. By choosing the adequate reduction factor N, the cold start converter circuit will only start energy harvesting when the energy harvester is providing the input power at the optimum input voltage.

Typically, the energy harvester used with the PMIC according to the invention is capable of providing an input power having a value between 1 microwatt and 1 Watt and an input voltage at the first input terminal 11 between 0.05 V and 100 V.

In FIG. 4 a further example of a PMIC according to the invention comprising a number of additional terminals 14,15,16 is shown. A storage capacitor terminal 14 is conductively connected with the output of the voltage converter. The storage capacitor terminal 14 allows to connect, as shown on FIG. 7 and FIG. 8, a storage capacitor $C_{sto}$. As the storage capacitor is connected with the output of the voltage converter, the voltage at the output of the voltage converter corresponds to the voltage across the storage capacitor. The storage capacitor can for example have a value between 5 and 15 microfarad. The advantage of using such a storage capacitor $C_{sto}$ is that the minimum output voltage $V_{out\_MIN}$, generated by the cold-start circuit 21, can be reached faster when compared to a system without such a storage capacitor, as shown on FIG. 5, where the output of the voltage converter is only connected to a storage device. Depending of the size and type of storage device, charging the storage device to reach the minimum voltage $V_{out\_MIN}$ can take a long time. Therefore, when a storage capacitor $C_{sto}$ is connected to the storage capacitor terminal 14, the storage device can be disconnected during the cold start by a switch comprised in the connecting circuit 26.

In embodiments, as shown on FIG. 4, FIG. 7 and FIG. 8, the first connecting circuit 26 for transferring the output power of the voltage converter 20 to the first output terminal 12 comprises a storage regulating circuit 27. This storage regulating circuit 27 is configured for regulating the voltage of the storage device connected to the first output terminal 12. For example, the storage device regulating circuit 27 can comprise one or more switches, controlled by the controller 10, for regulating the charging of a storage device such as a battery, a capacitor or supercapacitor. The storage device regulating circuit can for example limit the voltage at the first output to a maximum voltage value.

In the embodiment shown on FIG. 4, the PMIC also comprises a first inductor terminal 15 and a second inductor terminal 16. These additional terminals allow to couple an external inductor 25 as shown for example on FIG. 7 and FIG. 8. As discussed above, this inductor 25 is used by the main voltage converter circuit for converting the input power into the output power.

In FIG. 8, an energy harvesting system 100 according to the invention comprising a storage device 60 connected to a first output terminal 12 and an application load 70 connected to a second output terminal 17 is shown. In FIG. 8, reference number 31 schematically represents a second connecting circuit for connecting the second output terminal 17 with the voltage converter 20 and/or with the first output terminal 12. Generally the second connecting circuit comprises a load regulating circuit 28 for regulating the transfer of electrical power from the storage device and/or from the voltage converter to the application load 70 that is connected to the second output terminal 17. The load control circuit 28 typically comprises an LDO (Low Drop-Out) regulator for supplying a voltage $V_{out2}$ at the second output terminal 17. For example, the application load can be a microcontroller or a radio transceiver.

In embodiments, as illustrated on FIG. 8, an optional input capacitor $C_{in}$, can be connected to an additional capacitor terminal 9 which is conductively connected with the input of the voltage converter 20. In some exemplary embodiments wherein the voltage converter is a DC/DC boost converter, the capacitor terminal 9 can be merged with the first inductor terminal 15. The input capacitor avoids that the input node collapses when the inductor current is building-up.

According to a second aspect of the invention, a method for starting energy harvesting from an energy harvester using a voltage converter 20 for converting an input power at a voltage $V_{in}$, into an output power at an output voltage $V_{out\_VC}$ is provided.

The method makes use of a voltage converter that comprises a main voltage converter circuit and a cold-start converter circuit. The main voltage converter circuit 22 operates the voltage converter in a normal operation mode M2 wherein the output voltage $V_{out\_VC}$ is equal or larger than a minimum voltage value $V_{out\_MIN}$. The cold-start circuit 21 operates the voltage converter in a degraded mode M1 wherein the output voltage $V_{out\_VC}$ is lower than the minimum voltage value $V_{out\_MIN}$.

The method according to the invention comprises steps of
  coupling the energy harvester with the voltage converter for providing the input power to the voltage converter,
  defining an optimum voltage $V_{opt}$ for extracting power from the energy harvester,
  providing a voltage comparator for comparing an input voltage with a comparator reference voltage $V_{ref}$,
  defining a voltage reduction factor $N=V_{opt}/V_{ref}$,
  using a voltage reducer to generate a voltage $V_{EN-CS}=V_{in}/N$, wherein $V_{in}$, is the input voltage at the voltage converter and N is the reduction factor,
  using said voltage $V_{EN-CS}$ as the input voltage for said voltage comparator so as to compare said voltage $V_{EN-CS}$ with said comparator reference voltage $V_{ref}$,
  enabling operation of the voltage converter in said degraded operation mode (M1) with said cold-start circuit (21) when $V_{EN-CS} \leq V_{ref}$ and when $V_{out\_VC} < V_{out\_MIN}$, enabling operation of the voltage converter in said normal operation mode (M2) with said main voltage converter circuit (22) when $V_{out\_VC} \geq V_{out\_MIN}$.

The method according the invention is not limited by the order of the steps given above.

The present invention has been described in terms of specific embodiments, which are illustrative of the invention and not to be construed as limiting. It will be appreciated by persons skilled in the art that the present invention is not limited by what has been particularly shown and/or described above and that alternatives or modified embodiments could be developed in the light of the overall teaching of this disclosure. Use of the verb "to comprise", as well as the respective conjugations, does not exclude the presence of elements other than those stated. Use of the article "a", "an" or "the" preceding an element does not exclude the presence of a plurality of such elements.

The invention claimed is:

1. A power management integrated circuit for managing energy from an energy harvester, said power management integrated circuit comprising:
a first input terminal that receives an input power from the energy harvester;
a first output terminal that connects an energy storage device or an application load;
a voltage converter that converts the input power into an output power, and wherein the voltage converter is operable to provide said output power at an output voltage $V_{out\_VC}$, said voltage converter comprises:
a main voltage converter circuit operable when the output voltage $V_{out\_VC}$ is equal or larger than a minimum voltage value $V_{out\_MIN}$, and
a cold-start circuit operable when the output voltage $V_{out\_VC}$ is lower than said minimum voltage value $V_{out\_MIN}$;
a conducting path that transfers the input power from the first input terminal to the voltage converter;
a first connecting circuit that transfers the output power of the voltage converter to said first output terminal;
wherein said power management integrated circuit further comprises:
a second input terminal that receives a voltage $V_{EN-CS}$;
a voltage comparator connected to the second input terminal configured to monitor said voltage $V_{EN-CS}$ at the second input terminal and that compares said voltage $V_{EN-CS}$ with a reference voltage $V_{ref}$;
a controller in communication with the voltage converter that controls the voltage converter; and
wherein the controller is configured to enable said cold-start circuit when $V_{EN-CS} \geq V_{ref}$ and $V_{out\_VC} < V_{out\_MIN}$.

2. The power management integrated circuit according to claim 1 wherein said controller is further configured to disable said cold-start circuit and to enable said main voltage converter circuit when $V_{out\_VC} \geq V_{out\_MIN}$.

3. The power management integrated circuit according to claim 1 further comprising a reference voltage generator that generates said reference voltage $V_{ref}$.

4. The power management integrated circuit according to claim 1 further comprising an output voltage sensing circuit configured for comparing the output voltage $V_{out\_VC}$ with said minimum voltage $V_{out\_MIN}$.

5. The power management integrated circuit according to claim 1 wherein said main voltage converter circuit comprises an inductive boost converter circuit or a buck converter circuit or a buck-boost converter circuit.

6. The power management integrated circuit according to claim 1 wherein said cold-start circuit comprises a charge pump and one or more oscillators; and
wherein said controller enables or disables said cold-start circuit by enabling or disabling said one or more oscillators.

7. The power management integrated circuit according to claim 1 wherein said comparator reference voltage $V_{ref}$ has a value between 0.2 V and 0.6 V.

8. The power management integrated circuit according to claim 1 further comprising a storage capacitor terminal that connects a storage capacitor; and
wherein said storage capacitor terminal is conductively connected with an output of the voltage converter.

9. The power management integrated circuit according to claim 1 further comprising a first inductor and a second inductor terminal configured to couple an external inductor to the voltage converter.

10. The power management integrated circuit according to claim 1 further comprising:
a second output terminal that connects the application load, and
a second connecting circuit that connects the second output terminal with at least one of the voltage converter or with the first output terminal.

11. An energy harvesting system comprising:
the power management integrated circuit according to claim 1;
the energy harvester connected to said first input terminal;
the energy storage device connected to said first output terminal;
a voltage reducer configured to generate said voltage $V_{EN-CS}$ at said second input terminal;
wherein said voltage $V_{EN-CS}$ is proportional with an input voltage $V_{in}$ at said first input terminal; and
wherein $V_{EN-CS} = V_{in}/N$ with N>1 being a voltage reduction factor.

12. An energy harvesting system according to claim 11 wherein said voltage reducer comprises:
a first impedance with impedance value Z1 conductively connected with a first end to the first input terminal and conductively connected with a second end to the second input terminal;
a second impedance with impedance value Z2 conductively connected with a first end to the second input terminal and conductively connected with a second end to a common ground level wherein $V_{EN-CS} = V_{in} \times Z2/(Z1+Z2)$.

13. An energy harvesting system comprising:
the power management integrated circuit according to claim 10;
the energy harvester connected to said first input terminal;
the energy storage device connected to said first output terminal;
a voltage reducer configured to generate a voltage $V_{EN-CS}$ at said second input terminal and wherein said voltage $V_{EN-CS}$ is proportional with an input voltage $V_{in}$ at said first input terminal and wherein $V_{EN-CS} = V_{in}/N$ with N>1 being a voltage reduction factor; and
the application load connected to said second output terminal.

14. An energy harvesting system according to claim 11 wherein said energy harvester provides an input power having a value between 1 microwatt and 1 Watt at an input voltage $V_{in}$ at the first input terminal having a value between 0.05 V and 100 V.

15. A method for energy harvesting from an energy harvester using a voltage converter for converting an input power at a voltage $V_{in}$ into an output power at an output voltage $V_{out\_VC}$, and wherein said voltage converter comprises:
- a main voltage converter circuit for operating the voltage converter in a normal operation mode (M2) wherein the output voltage $V_{out\_VC}$ is equal or larger than a minimum voltage value $V_{out\_MIN}$; and
- a cold-start circuit for operating the voltage converter in a degraded mode (M1) wherein the output voltage $V_{out\_VC}$ is lower than said minimum voltage value $V_{out\_MIN}$;

said method comprising steps of:
- coupling the energy harvester with the voltage converter for providing said input power;
- providing a voltage comparator for comparing an input voltage with a reference voltage $V_{ref}$;
- providing a voltage reducer for generating a voltage $V_{EN-CS}=V_{in}/N$, wherein $V_{in}$ is said input voltage and N is reduction factor $N=V_{opt}/V_{reg}$, wherein $V_{opt}$ is an optimum voltage for extracting a maximum power from said energy harvester;
- comparing said voltage $V_{EN-CS}$ as the input voltage for said voltage comparator with said reference voltage $V_{ref}$;
- enabling operation of the voltage converter in said degraded mode (M1) with said cold-start circuit when $V_{EN-CS} \geq V_{ref}$ and when $V_{out\_VC} < V_{out\_MIN}$; and
- enabling operation of the voltage converter in said normal operation mode (M2) with said main voltage converter circuit when $V_{out\_VC} \geq V_{out\_MIN}$.

16. An energy harvesting system according to claim 12 wherein said energy harvester provides an input power having a value between 1 microwatt and 1 Watt at an input voltage $V_{in}$ at the first input terminal having a value between 0.05 V and 100 V.

17. An energy harvesting system according to claim 13 wherein said energy harvester provides an input power having a value between 1 microwatt and 1 Watt at an input voltage $V_{in}$ at the first input terminal having a value between 0.05 V and 100 V.

* * * * *